Feb. 27, 1968   J. D. SCHERER ETAL   3,370,874
HERMETIC METAL-TO-GLASS SEAL AND APPLICATION THEREOF
Filed July 21, 1966

INVENTORS.
JEREMY D. SCHERER
WILLIAM F. RUDOLPH

BY                ATTORNEYS.

United States Patent Office 3,370,874
Patented Feb. 27, 1968

3,370,874
HERMETIC METAL-TO-GLASS SEAL AND
APPLICATION THEREOF
Jeremy D. Scherer, South Dartmouth, and William F.
Rudolph, New Bedford, Mass., assignors to Isotronics,
Inc., New Bedford, Mass., a corporation of New Jersey
Filed July 21, 1966, Ser. No. 566,901
8 Claims. (Cl. 287—189.365)

ABSTRACT OF THE DISCLOSURE

A hermetic seal component comprising at least one tantalum or niobium metal terminal extending through a mass of glass thermally fused to the metal terminal to form a positive meniscus with respect to the metal terminal. The surface of the terminal is substantially free of oxide so that it is capable of having an electrolytic oxide subsequently formed on its surface and the glass has a coefficient of thermal expansion greater than that of the metal of the terminal. The components are prepared by forming an assembly of at least one terminal, the surface of which is substantially free of oxide, and a mass of glass disposed around the circumference of the terminal, and firing the thus prepared assembly in an inert atmosphere, under conditions such that the glass forms a positive meniscus with respect to the terminal.

Background of the invention

Figure 1:
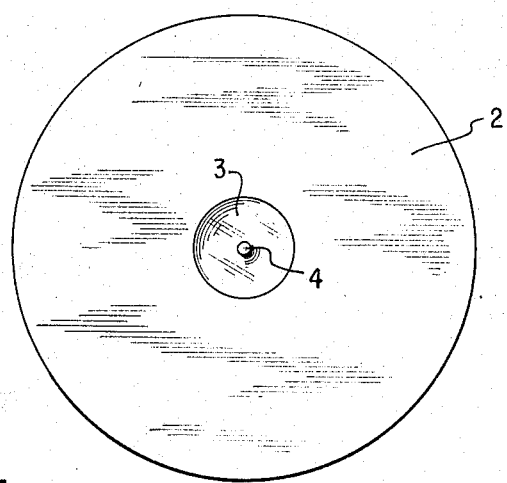

This invention relates to a method of manufacturing hermetic metal-to-glass seals, and to the product of such method. The invention is specifically concerned with a method of manufacturing tantalum, or niobium-to-glass hermetic seals in such a manner that the hermetic seal will considerably improve the performance of liquid or paste electrolyte capacitors when such seals are used as capacitor components. This invention also contemplates tantalum or niobium-to-glass components.

Manufacturers of liquid or paste electrolyte have encountered problems with the leakage of the electrolyte. The electrolytes commonly used in these capacitors contain such corrosive chemicals as lithium chloride, sulfuric acid, and acetic acid. If the electrolyte leaks out of the capacitor, it not only degrades the performance of the capacitor, but often destroys the equipment in which the capacitors are used. Prior art liquid electrolyte capacitors are usually sealed by means of a Teflon O-ring placed under pressure. Although this type of seal is fairly effective, over a period of time such conditions as shock, vibration, changes in temperature, etc. often cause the Teflon O-ring seal to lose its effectiveness, resulting in a leakage of electrolyte.

By following the method of the present invention it is possible to prepare a glass-to-tantalum or niobium hermetic seal which will overcome many of the difficulties inherent in a Teflon O-ring seal. The use of such seals in capacitors results in considerably improved performance.

Hermetic glass-to-metal seals are usually one of two types: "matched" seals in which the glass and the metal have approximately the same coefficient of thermal expansion, relying on adhesion between the glass and the metal for hermeticity; and "matched" seals in which the glass and metal have different coefficients of thermal expansion.

Glass-to-metal seals in which the glass and metal adhere are usually made by heating the glass and metal in an oxidizing atmosphere, i.e. air to a temperature high enough that a layer of metal oxide forms on the surface of the metal. This oxide layer is considered desirable because, being soluble in both glass and the metal, it acts as a cement, thus assuring a good bond. In fact, glass generally will not adhere to the surface of a metal which is not oxidized (see Partridge, Glass-to-Metal Seals, The Society of Glass Technology, 1949, page 213).

It is possible to form a hermetic seal between glass and such metals as tantalum and niobium in much the same manner that hermetic seals between glass and other metals are made, that is, merely by intimately contacting the metal and the glass and heating in air to a temperature above the melting point of the glass. However, when such a technique is used with tantalum or niobium the component thus formed will be of little or no use to a capacitor manufacturer, because tantalum and niobium undergo what is known as hydrogen embrittlement and/or will develop an oxide on their surface when the metal and glass are heated to a temperature at which the glass will fuse to the metal. When this happens what is known as electrolytic oxide formation cannot be produced on the surface of the metal. When this cannot be done, the components will have very poor performance characteristics in capacitors. Unless an electrolytic oxide formation can be produced on at least one metal surface of the component, capacitors containing the component will have high electrical leakage, poor equivalent series resistance, poor voltage characteristics and a short life.

The electrolytic oxide formation is produced on tantalum, for example, electrochemically, by passing an electric current through a bath, such as an aqueous solution of phosphoric acid and titanium chloride, in which the metal is suspended. The tantalum acts as an anode. The electrolytic oxide formation thus produced is an amorphous dielectric material, tantalum pentoxide, which is formed on the metal in a very thin, uniform coating. The oxide coating is of both uniform thickness and in area covered, i.e., free from voids. In contrast, thermally grown tantalum pentoxide, the oxide formed on tantalum by direct reaction with oxygen, is crystalline and tends to form a non-uniform coating. If the thermally grown tantalum pentoxide forms a relatively thick coat, such as that formed when the tantalum is heated to an elevated temperature in an oxidizing atmosphere, it is impossible to form the amorphous tantalum pentoxide coating, which is essential to obtaining good performance in capacitors.

It is not possible to produce an electrolytic oxide formation on the tantalum or niobium prior to formation of the seal, as the electrolytic oxide formation tends to decompose at the temperatures necessary to fuse the glass to the metal.

In unmatched glass seals, several limitations must be met so that the stresses can be reduced to a level below which they will cause the glass to crack. Generally this is done by using fine wires (less than 0.6 mm. in diameter) for wire through glass type seals, and by the use of ductile metals which yield at stresses lower than the breaking strength of the glass. Copper is commonly used in such seals, because, despite its high coefficient of thermal expansion (about $16.7 \times 10^{-6}$), it yields at comparatively low stresses. However, even in "unmatched" seals, it is considered essential that the metal be coated with a thin layer of metal oxide if the seal is to be hermetic.

Summary of claimed invention

The seals of the present invention, in their broadest aspect, comprise at least one tantalum or niobium metal terminal extending through a mass of glass thermally fused to the metal terminal to form a positive meniscus with respect to the metal terminal. The surface of the terminal is substantially free of oxide so that the terminal is capable of having an electrolytic oxide subsequently formed on its surface and the glass has a coefficient of thermal expansion greater than that of the metal of the terminal. The glass may be disposed within and thermally fused to an eyelet having a coefficient of thermal expansion at least approximately as great as that of the glass. An electrolytic oxide readily may be placed on the surface of the metal of the terminals of such seals down to the terminal-glass interface to provide an hermetic seal adapted for use, inter alia, in electrolytic capacitors.

The seals of the present invention exhibit a high degree of hermeticity and are extremely reliable when used in capacitors and the like. Furthermore, the seals of the present invention are not subject to the limitations of prior art "unmatched" seals. They do not require extremely fine wires, nor are the metals required to be extremely ductile to qualify for use. Electrolytic oxides readily may be formed on the surfaces of the tantalum or niobium terminals.

It is believed that the hermeticity of the seals of the present invention is due to the combination of the stresses in the seal produced by the difference in coefficients of thermal expansion of the various elements of the seal component and by adhesion between the bare metal and the glass, obtained by heating the seal to a temperature at which the glass "wets" the metal.

In preparing a tantalum or niobium to glass seal, in which the tantalum or niobium terminal is capable of having an electrolytic oxide formation produced on its surface, it is essential to restrict the presence of hydrogen and oxygen while the seal is being made. While the presence of hydrogen and oxygen during the assembly of glass and tantalum or niobium elements into an unfused seal component, at room temperature, appears to have little or no detrimental effect as to the metal, when the seals are heated to the temperature necessary to melt the glass, the speed of reaction of the metal with hydrogen and oxygen greatly increases and the metal is rendered unsuitable for use in capacitors in a very short time. By preparing the glass-to-metal seal in an inert atmosphere, such as a vacuum or an atmosphere of argon, helium, neon, nitrogen, etc., it is possible to produce metal to glass seals in which the subsequent production of an electrolytic oxide formation on a metal surface is not inhibited. Of course, the use of an inert gas atmosphere inhibits the formation of an oxide coating on the tantalum or niobium terminal during the fusing process. However, it has been found, surprisingly, that by making the seal component of a mass of glass through which a tantalum or niobium terminal extends, and which glass has a coefficient of thermal expansion which is at least as great as the coefficient of thermal expansion of the tantalum or niobium a hermetic seal is formed even when the assembly is fired in an inert atmosphere, if the firing takes place at a temperature high enough to render the glass sufficiently fluid so that it will "wet" the tantalum or niobium terminal, and form a positive meniscus with respect thereto.

The invention may be more fully understood with reference to the accompanying drawing.

Figure 2:
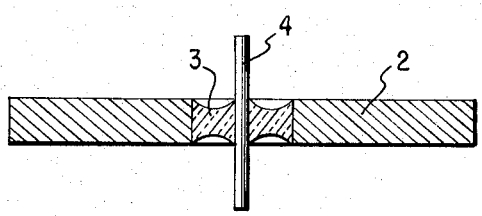

FIGURE 1 is a plain view of a typical seal component, while FIGURE 2 is a transverse vertical section through the seal component of FIGURE 1.

Referring specifically to the drawings, 2 represents a metal eyelet, ferrule or the like, formed of a metal such as tantalum, stainless steel, titanium, niobium or silver. Many other metals may be employed, provided they are compatible with the environment the seal will be subjected to, i.e. capacitor electrolytes etc. The tantalum or niobium, conductor or terminal 4 passes through the eyelet, out of contact therewith. A body of glass 3, completely fills the void between conductor 4 and eyelet 2. The glass has a coefficient of thermal expansion at least as great as that of the tantalum and niobium terminal. Typical of such glasses would be 9010, manufactured by the Corning Glass Company, having a coefficient of thermal expansion of about $9 \times 10^{-6}$, or Series 41, manufactured by Mansol Ceramics. The coefficient of thermal expansion of tantalum, for example is about $6.5 \times 10^{-6}$.

While the drawings show a single terminal extending through the eyelet 2, it will be appreciated that a multiplicity of terminals may be used, provided that the terminals are out of contact with the eyelet and each other. Such a component would be useful, for example, to seal units which had a multiplicity of capacitors within a given container.

It will also be appreciated that while the drawings show the terminal as a solid wire, it may be a hollow tube. When a hollow tube is used in the seal, a wire may be placed through the tube, and the tube welded shut to the wire.

The preferred method of the present invention contemplates forming a hermetic seal component by forming an assembly comprising a metal eyelet, such as shown at 2 and a tantalum or niobium terminal extending through the eyelet but not in contact therewith. A mass of glass having a coefficient of thermal expansion greater than the metal of the terminal is placed around the wire, and in proximity to the aperture in the eyelet. The glass mass may, for example, be in the form of a glass bead with a hole in the center through which the terminal may be inserted. The thus prepared assembly is heated under an inert atmosphere to or above a temperature at which the glass will "wet" the terminal. It is apparent that the assembly cools, and the glass solidifies, the glass, which has a higher coefficient of thermal expansion than the terminal, will have a tendency to contract at a greater rate than the terminal. The greater rate of contraction will cause the glass to shrink very tightly around the wire, and will set up stresses in the seal.

It is obvious that additional stresses may be placed in the seal by making the eyelet of a metal that has a coefficient of thermal expansion that is greater than that of the glass. However, it is not necessary to use such a metal to obtain a hermetic seal. The metal of the eyelet may have approximately the same coefficient of thermal expansion as the glass, or it may even be less, if the differences in coefficients of thermal expansion of the wire and glass are great enough to maintain stress on the seal of the wire to the glass throughout the temperature range to which the seal would be exposed in use. Furthermore, since it is usually not necessary to subsequently produce an electrolytic oxide formation on the metal of the eyelet, the metal of the eyelet may be oxidized before forming the seal assembly by heating in an oxidizing atmosphere, or by dipping in an oxidizing solution or by other methods well known in the art. It is also possible, by using highly annealed and therefore very soft eyelets, which are extremely thin walled, to cause the eyelet to expand and contract at the rate of the glass rather than the rate of the eyelet material itself, provided the glass is adequately bonded to the eyelet. Thus, a hermetic seal may be formed between the glass and the metal of the eyelet which does not depend on stresses in the seal for its hermeticity. In selecting a metal for the eyelet, several factors should be considered, in addition to the coefficient of thermal expansion, including compatibility with other materials it may be used in conjunction with.

It will also be appreciated that it is not necessary to use an eyelet in preparing the seal. In its broadest sense, the present invention contemplates a hermetic seal component consisting merely of a tantalum or niobium terminal extending through a mass of glass, which glass is in intimate contact with the terminal, and which glass has a positive meniscus with respect to the terminal and a coefficient of thermal expansion at least as great as that of the metal of the terminal. Such a component could be prepared by simply disposing a mass of such a glass around the circumference of the thermal, and firing the thus prepared assembly in an inert atmosphere at a temperature at which the glass will form a positive meniscus with respect to the terminal. Of course, before such a component could be used in a capacitor, it would be necessary to hermetically seal a collar around the glass to provide a means for attaching the seal to the capacitor casing. This could be done by any of a number of methods known in the art, such as by vapor deposition.

A critical aspect of the present process is the temperature at which the eyelet-glass-terminal assembly is fired. Although the specific temperature at the assembly must be fired to obtain a hermetic seal depends upon the properties of the particular glass used, it is critical that the assembly be heated to a temperature sufficiently above the melting point of the glass so that the glass forms a positive meniscus with respect to the terminal, that is the glass must be heated to a temperature at which it is sufficiently fluid that it wets the tanalum or niobium terminal and begins to flow along the terminal. Furthermore, in the manufacture of metal to glass seal components for use in capacitors, it is important to produce a good electrolytic oxide formation on the metal in the area close to the glass. If the glass is not heated to a sufficiently high temperature, even if a good hermetic seal would form, the glass will form a negative meniscus with respect to the metal terminal. In a seal component for use in capacitors, it is very difficult to produce a good electrolytic oxide formation on the terminal close to the wire-glass interface if the seal has been formed in such a manner that the glass has a negative meniscus. If the electrolytic oxide formation cannot be produced at the terminal-glass interface of the seal, a capacitor containing such a seal will exhibit high electrical leakage, poor equivalent series resistance, and poor voltage characteristics. After a short time of operation the battery effect due to the operation of the capacitor will produce an oxide formation down to the interface of the terminal and glass, somewhat curing these problems. However, when the electrolytic oxide is formed, it may press out against the glass in such a manner as to crack the glass in the area of the negative meniscus, thus destroying the hermeticity of the seal.

As an example, using 9010 glass, the glass begins to soften at about 1500° F., but a good degree of hermeticity is not obtained until a temperature of 1700° F. is reached, while a fairly good positive meniscus is not obtained until a temperature of 1900° F. is reached. These temperatures are merely cited as illustrative, as the temperature necessary to obtain a good positive meniscus will depend on the type of glass used. The temperature necessary to obtain a positive meniscus with any particular glass may readily be determined by one skilled in the art. Nearly any of the "soft" glasses which have high coefficients of thermal expansion may be used; providing the insulation resistance is satisfactory for the use intended.

Normally the metal-glass assembly is fired in an inert gas atmosphere, at a pressure of approximately one atmosphere and a dew point of 70° F. or lower. The seal assembly may be fired in a vacuum or at a reduced pressure in inert gas, however, when reduced pressures are used, care has to be exercised that the glass does not contain anything which will expand to a large degree. If the glass contains impurities or other ingredients that will expand, the glass will froth under a greatly reduced pressure and a weak or ineffective seal will be produced. The metal glass assembly can also be fired under an inert gas pressure greater than one atmosphere, whereby better heat transference is obtained than when a reduced pressure is used.

Specifically, the preferred process of the present invention comprises forming an assembly which comprises a metal eyelet; a tantalum or niobium terminal extending through the eyelet; and a mass of glass which has a coefficient of thermal expansion greater than that of the metal of the terminal disposed between the metal eyelet and the terminal; and firing the thus prepared assembly in an inert atmosphere at a temperature at which the glass will form a positive meniscus with respect to the terminal.

It is a preferred embodiment of any of the present processes to allow the metal-to-glass seal to cool to about room temperature before removal from an inert atmosphere.

The present invention also contemplates seal components made by the above process and capacitors containing such seals. Specifically the preferred hermetic seal components of the present invention comprise a metal eyelet, a tantalum or niobium terminal extending through the eyelet but not in contact therewith, a mass of glass having a coefficient of thermal expansion at least as great as that of the metal of the terminal disposed between the terminal and the eyelet and in intimate contact with the terminal and the eyelet, and having a positive meniscus with respect to the terminal.

Seals prepared by the method of the disclosed invention using 9010 glass at a temperature of 1900° F., have a leakage rate less than $1 \times 10^{-7}$ cc./second, determined by the leak rate as measured on a Helium Mass Spectrometer. A leakage rate less than $1 \times 10^{-9}$ cc./second is often achieved. The tantalum or niobium conductors of such seals readily take the formation of electrolytic oxides. Using the common 9010 glass, a stainless steel eyelet, and a tantalum lead, it is possible to achieve good hermeticity over a temperature range of about $-100°$ C. to about $+175°$ C. With the proper glass and eyelet material even larger temperature ranges can be encompassed.

It will, of course, be appreciated that the metal to glass seal components prepared in the method described may have many various uses, such as capacitors that employ a liquid electrolyte. The seal components may be readily attached to the metal wall or casing of a capacitor by welding, brazing, soldering, etc. the eyelet of the seal to the wall or casing of the capacitor.

What is claimed is:

1. A hermetic seal component comprising a mass of glass and at least one terminal extending through said glass, said terminal being of a metal selected from the group consisting of tantalum and niobium, said glass being thermally fused to said metal terminal forming a positive meniscus with respect to said metal terminal, the surface of said metal terminal being substantially free of oxide so as to be capable of having an electrolytic oxide formed thereon, and said glass having a coefficient of thermal expansion greater than that of the metal of said terminal.

2. The component of claim 1 in which said glass has a coefficient of thermal expansion of about $9 \times 10^{-6}$ cm./cm./° C.

3. A hermetic seal component comprising an eyelet member, at least one terminal extending through the eyelet, but not in contact therewith, said terminal being of a metal selected from the group consisting of tantalum and niobium, a mass of glass disposed between said metal terminal and said eyelet and thermally fused to each forming a positive meniscus with respect to said metal terminal, the surface of said metal terminal being substantially free of oxide so as to be capable of having an electrolytic oxide formed on its surface, said glass having a coefficient of thermal expansion greater than that of the metal of said terminal, said eyelet being of a material having a coefficient of thermal expansion at least approximately as great as that of said glass.

4. The component of claim 3 in which said eyelet is silver.

5. The component of claim 3 in which said eyelet is of a highly annealed, soft metal, and in which the glass is bonded to said soft metal, said eyelet being formed with thin walls, whereby said eyelet will thermally expand and contract substantially at the rate of said glass, rather than at the rate of said metal of said eyelet.

6. The component of claim 3 in which said glass has a coefficient of thermal expansion of about $9 \times 10^{-6}$ cm./cm./° C.

7. A hermetic seal component comprising an eyelet member, at least one terminal extending through the eyelet but not in contact therewith, said terminal being of a metal selected from the group consisting of tantalum and niobium, a mass of glass disposed between said terminal and said eyelet and thermally fused to each forming a positive meniscus with respect to said metal terminal, said glass having a coefficient of thermal expansion greater than that of the metal of said terminal, said eyelet being of a material having a coefficient of expansion at least approximately as great as that of said glass, said metal terminal having an electrolytic oxide formed thereon to the glass-terminal interface.

8. A hermetically sealed capacitor, employing the glass-to-metal seal component of claim 7.

References Cited

UNITED STATES PATENTS

| | | | |
|---|---|---|---|
| 732,812 | 7/1903 | Anderson | 29—25.12 |
| 1,184,813 | 5/1916 | Birdsall | 287—189.365 |
| 1,293,441 | 2/1919 | Houskeeper | 273—199 |
| 1,294,466 | 2/1919 | Houskeeper | 273—199 |
| 1,456,110 | 5/1923 | Mackay | 174—167 |
| 1,680,738 | 8/1928 | Hull | 174—167 |
| 1,964,329 | 6/1934 | Nordberg | 65—59 |
| 2,334,020 | 11/1943 | Miller et al. | 65—59 |
| 2,338,538 | 1/1944 | Pulfrich et al. | 65—59 |
| 2,345,278 | 3/1944 | Monack | 65—59 |
| 2,429,955 | 10/1947 | Goldsmith | 174—153 |
| 2,456,653 | 12/1948 | Snow et al. | 174—28 |
| 2,457,144 | 12/1948 | Goodale | 65—59 |
| 2,509,906 | 5/1950 | Clark et al. | 65—59 |
| 2,651,144 | 9/1953 | Foley et al. | 65—59 |
| 3,035,372 | 5/1962 | Mayers | 65—59 |
| 3,036,674 | 5/1962 | Branin | 287—189.365 |
| 3,065,571 | 11/1962 | Hill | 154—2.5 |
| 3,113,878 | 12/1963 | Martin | 65—59 |
| 3,131,337 | 4/1964 | Clement | 317—230 |
| 3,220,815 | 11/1965 | McMillan et al. | 65—32 |
| 3,225,132 | 12/1965 | Baas et al. | 174—151 |
| 3,243,668 | 3/1966 | Diggens | 317—230 |
| 3,255,386 | 6/1966 | Millard et al. | 317—230 |
| 3,264,015 | 8/1966 | Mayers | 285—189 |
| 3,264,708 | 8/1966 | Diggens | 29—25.31 |
| 3,275,358 | 9/1966 | Shonebarger | 287—189.365 |
| 3,293,507 | 12/1966 | Smith | 317—230 |
| 3,301,270 | 1/1967 | Horn | 317—230 |
| 2,394,398 | 2/1946 | Mouromtseff et al. | 317—230 |
| 2,770,923 | 11/1956 | Dalton et al. | 287—189.365 |
| 3,275,359 | 9/1966 | Graff | 287—189.365 |
| 3,275,901 | 9/1966 | Merritt et al. | 317—230 |

FOREIGN PATENTS 734,155  3/1937  Germany.

OTHER REFERENCES

S. P. Mitoff: Journal of the American Ceramics Society, vol. 40, pp. 118–120.

J. Comers: "Glass-to-Metal Seals," Electrical Manufacturing, March 1958, pp. 110–114, 308.

Astia Report No. 430,355, "Hermetically Sealed Electrolytic Capacitors," Final Report, May 15, 1962 to Nov. 15, 1963.

CARL W. TOMLIN, Primary Examiner.

EDWARD C. ALLEN, Examiner.

R. S. BRITTS, Assistant Examiner.